Patented July 5, 1927.

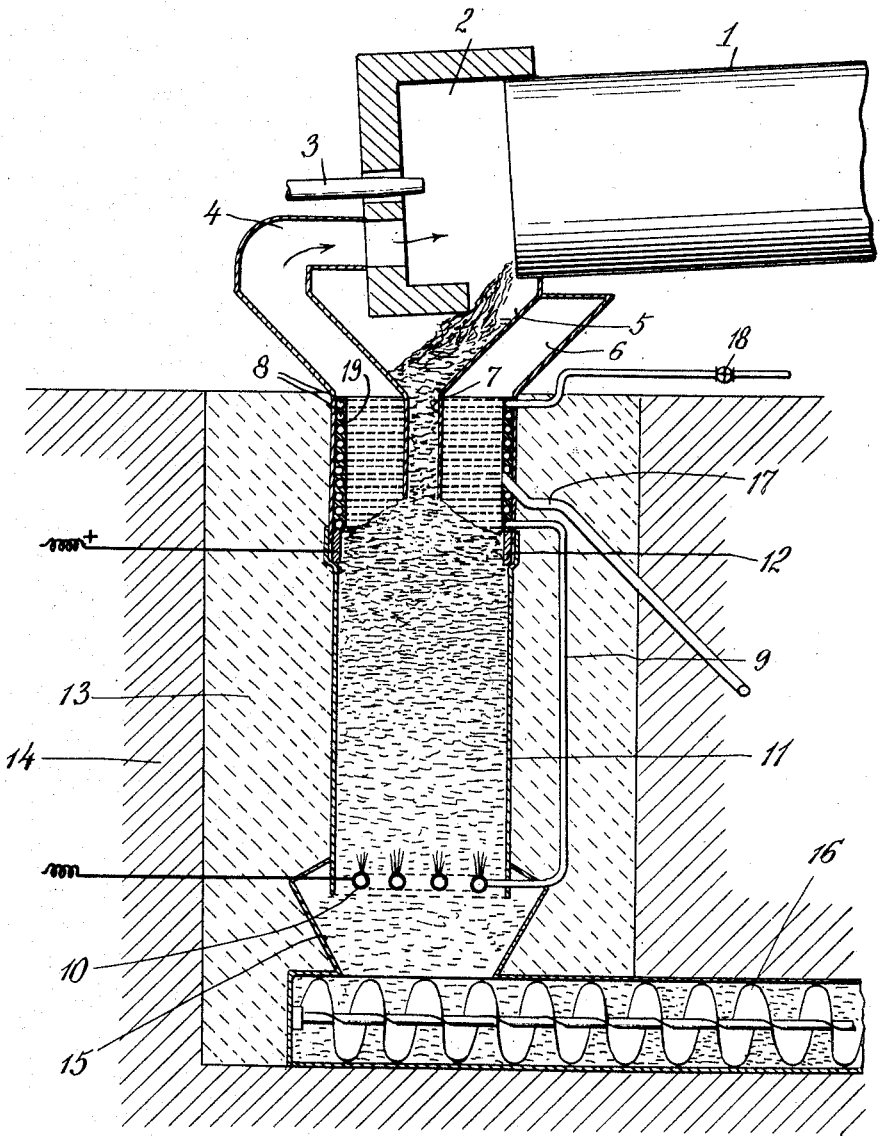

1,634,477

UNITED STATES PATENT OFFICE.

LEONARD WICKENDEN, OF FLUSHING, NEW YORK, AND STANLEY A. W. OKELL, OF TYRONE, PENNSYLVANIA, ASSIGNORS TO INDUSTRIAL CHEMICAL COMPANY, OF NEW YORK, N. Y., A CORPORATION OF NEW YORK.

PROCESS FOR MAKING DECOLORIZING CARBON.

Application filed June 16, 1921. Serial No. 478,157.

This invention relates particularly to the manufacture of decolorizing carbon, which may be used effectively for clarifying sugary and other materials and the manufacturing process may comprise the preliminary calcination of the carbonized dissolved vegetable matter or other suitable material and subsequent treatment thereof as in a vertical electric furnace, where a mass or column of the material may be highly heated and simultaneously treated with steam carbon dioxide, air or other desired treating gases. The feed of the material through the vertical or other furnace may be regulated so as to effect its activation to the desired extent, and the carbon is then cooled before being exposed to the air or other objectionable oxidizing medium.

In the apparatus shown in the accompanying drawing, which is a diagrammatic vertical section, the calcining kiln 1 which may be of the rotary type may be mounted in any suitable way in connection with the hood 2. The carbonized material fed into this kiln is preferably calcined dissolved vegetable material, such as described in the Statham Patent 1,146,363, of July 13, 1915, which is of such porous character as to be desirable because of its permeability in different directions. This or other suitable carbonized material is preferably repeatedly washed with water and acid, so as to remove mineral matter to the desired extent; and is then passed through the rotary calcining kiln, where it is exposed to high temperature of 900 degrees or so centigrade, and simultaneously acted on by carbon dioxide, air, steam, or other gases. This calcining kiln may be heated in any suitable way as by the burner 3, through which a jet of oil or powdered coal fuel may be discharged to supply part or all of the heat of this calcining kiln.

This treatment renders the carbon quite effective for some decolorizing purposes when it falls from the lower end of the kiln preferably into the feed funnel or hopper 5 connecting with the feed tube 7. The hot carbon descends this tube and fills the treating furnace, which may comprise the substantially vertical refractory furnace tube 11 of earthen ware, fire clay or other suitable material, which is preferably supported within the heat insulating packing 13 of asbestos, silocel or other kieselguhr material or the like, and an outer setting 14 of brick work or other material may enclose and support the furnace and packing as indicated. The lower end of the furnace tube may communicate with the discharge hopper 15 leading into the discharge conveyor 16 of screw or other type, by which the treated material may be removed at the desired rate. This controls the movement of the carbon down through the treating furnace where it may remain twenty to sixty minutes more or less, depending on the treatment desired. It is desirable to heat the carbon in the treating furnace and electric heating means may be employed for this purpose such for instance as the heating electrode 12 arranged annularly or otherwise adjacent the top of the furnace and cooperating with another suitable electrode at the bottom, which if desired may be the treating and injecting nozzles 10 arranged in spiral or ring form near the bottom of the furnace 2. These nozzles which may have a series of holes or slots for the discharge of the treating gases, such as steam, carbon dioxide, air, or other gases, or mixtures thereof, may be in the electric heating circuit and may be supplied with the treating gases in any way as through the injecting pipe 9. This injecting pipe may advantageously include a preheating coil or portion 8 arranged adjacent the top of the treating furnace within the casing 6 and faced or protected by the fire clay lining 19 for example, and the treating gases which may be supplied in regulated amounts past the valve 18, may be highly heated as they flow through this preheating coil by the heat of the adjacent carbon and also by the combustion of the carbon monoxide and hydrogen issuing at the top of the furnace which may be burned in connection with additional supplies of air or gases for combustion from any number of suitable pipes such as 17. The upper end of this casing 6 may communicate with the heat flue 4, so that these hot gases may be discharged into the calcining kiln to heat the material therein, and also act as treating gases thereon as previously described.

Under operating conditions the carbon from the calcining kiln may have a decolorizing value of about 300 units or so on the standard kerosene red basis; and this carbon may remain in the vertical treating furnace for about a half hour where the treating gases such as steam, air, carbon dioxide or the like can effectively act on this highly heated carbon at temperatures of 900 to 1000 centigrade or so. In this way the decolorizing value of the carbon may be raised to 700 or more on this kerosene red scale and a carbon secured which is much more desirable for sugar clarifying purposes than vegetable decolorizing carbons heretofore available. For sugar clarifying or other carbons where sulphide or other impurities are undesirable, steam and air may be advantageously injected without admixture of combustion gases which usually contains sulphides. The steam is decomposed and tends to eliminate sulphides and the oxygen of the air by its combustion in the carbon particles produces carbon dioxide for activation purposes. Furthermore the loss of weight of the carbon in the treating furnace need not be more than 15 to 25 percent under operating conditions; so that even for sugar purposes it is unnecessary in many cases, to use iron or manganese chloride or other mineral protective material to minimize oxidation losses during this treatment. The electric heating of the carbon also seems to facilitate this activization, possible because the arcing which takes place between the carbon particles may render the gases more active in connection with the carbon; arcing or sparking frequently occurring among the carbon particles when the heating current has a voltage of 200 to 250 volts or so. This is further promoted by the vigorous agitation of the carbon particles which may be caused by the pressure injection of the treating gases which tends to render their action more uniform on the different particles. This electric heating of the material is also very desirable since the heat can be accurately regulated, and uniform heating and treating conditions thus secured in connection with pyrometer measurements adjacent the tube of the treating furnace.

This invention has been described in connection with a number of illustrative forms, elements, parts, apparatus, materials, conditions, temperatures and times of treatment, to the details of which disclosure the invention is not of course to be limited; since what is claimed as new and what is desired to be covered by Letters Patent is set forth in the appended claims:

1. In a process of making decolorizing carbon continuously passing carbonized dissolved vegetable material through a slightly inclined rotary kiln and thence through an electric furnace, while passing suitable treating gases through said furnace and kiln in the opposite direction and maintaining a temperature of upwards of 800° C. in said kiln and furnace substantially as described.

2. In a process of making decolorizing carbon heating a mass of granules of calcined carbonized dissolved vegetable material to a high temperature by passing electric currents through the mass while agitating and purifying the carbonized particles by passing treating gases through the mass.

3. The process of making decolorizing carbon which comprises calcining carbonized vegetable material and treating the same with gases comprising carbon dioxide, feeding the heated calcined carbon into an electric furnace, heating the carbon in said furnace and simultaneously injecting hot treating gases comprising steam and carbon dioxide into said heated carbon.

4. The process of making decolorizing carbon which comprises feeding heated calcined carbon into an electric furnace, heating the carbon in said furnace by cooperating electrodes effecting arc discharge of electricity between the carbon particles and simultaneously passing hot treating gases comprising steam and carbon dioxide through said heated carbon.

5. The process of making decolorizing carbon which comprises feeding carbon into a stack furnace, heating the carbon in said furnace and simultaneously passing hot treating gases through said heated carbon.

6. The process of making decolorizing carbon which comprises feeding a body of granular carbonized vegetable material into the upper end of a tubular electric furnace, electrically heating the carbon in said furnace by cooperating electrodes and simultaneously injecting hot treating gases through the carbon substantially filling the bore of the furnace in the direction opposite to their feeding movement.

7. The process of making decolorizing carbon which comprises feeding a body of granular carbonized vegetable material into the upper end of a tubular electric furnace, electrically heating the carbon in said furnace, and simultaneously injecting treating gases through the carbon substantially filling the bore of the furnace to minimize combustion losses.

8. The method of obtaining a highly activated decolorizing carbon which comprises simultaneously heating and agitating carbonized liquid residues in an electric furnace.

9. The method of obtaining a highly activated decolorizing carbon which comprises simultaneously heating and agitating carbonized liquid residues in an electric furnace by passing electric currents and treating gases therethrough.

10. The method of increasing the decolorizing efficiency of porous carbonized particles which comprises heating the same by passing electric currents therethrough while agitating the same in the presence of treating gases.

LEONARD WICKENDEN.
STANLEY A. W. OKELL.